United States Patent
Claussen et al.

(10) Patent No.: US 9,702,768 B2
(45) Date of Patent: Jul. 11, 2017

(54) NOISE ROBUST TIME OF FLIGHT ESTIMATION FOR ACOUSTIC PYROMETRY

(71) Applicants: Heiko Claussen, Plainsboro, NJ (US); Justinian Rosca, West Windsor, NJ (US); Michelle Xiaohong Yan, Princeton, NJ (US); Upul P. DeSilva, Oviedo, FL (US); Nancy H. Ulerich, Longwood, FL (US)

(72) Inventors: Heiko Claussen, Plainsboro, NJ (US); Justinian Rosca, West Windsor, NJ (US); Michelle Xiaohong Yan, Princeton, NJ (US); Upul P. DeSilva, Oviedo, FL (US); Nancy H. Ulerich, Longwood, FL (US)

(73) Assignee: Siemens Corporation, Iselin, NJ (US)

( * ) Notice: Subject to any disclaimer, the term of this patent is extended or adjusted under 35 U.S.C. 154(b) by 820 days.

(21) Appl. No.: 13/961,292

(22) Filed: Aug. 7, 2013

(65) Prior Publication Data
US 2014/0064326 A1  Mar. 6, 2014

Related U.S. Application Data

(60) Provisional application No. 61/696,852, filed on Sep. 5, 2012.

(51) Int. Cl.
*G01K 11/24* (2006.01)
*G01K 13/02* (2006.01)

(52) U.S. Cl.
CPC .............. *G01K 11/24* (2013.01); *G01K 13/02* (2013.01); *G01K 2013/024* (2013.01)

(58) Field of Classification Search
CPC ........ G01K 11/24; G01K 11/00; G01K 11/22; G01K 13/02; G01K 2013/024;
(Continued)

(56) References Cited

U.S. PATENT DOCUMENTS

| 4,848,924 A | 7/1989 | Nuspl | |
|---|---|---|---|
| 5,349,859 A * | 9/1994 | Kleppe | G01K 11/24 367/100 |

(Continued)

OTHER PUBLICATIONS

C. Knapp, et. al., The Generalized Correlation Method for Estimation of Time Delay, IEEE Transactions Acoustics, Speech, and Signal Proc., V. ASSP-24, N. 4, 320-7, Aug. 1976.
(Continued)

*Primary Examiner* — Manuel L Barbee

(57) ABSTRACT

An acoustic signal traversing a hot gas is sampled at a source and a receiver and is represented in overlapping windows that maximize useable signal content. Samples in each window are processed to represented in different sparsified bins in the frequency domain. Determining a signal delay between the source and the receiver from a summation of maximum smoothed coherence transform cross-correlation values of different data windows wherein a sparseness of a mean smoothed coherence transform cross-correlation of windows is maximized. Determining a set of delay times wherein outliers are deleted to estimate a time of flight from which a temperature of the hot gas is calculated.

18 Claims, 6 Drawing Sheets

(58) Field of Classification Search
CPC ........... G01K 2013/026; G01N 29/024; G01N 29/02; G01J 5/42; G01J 5/00
See application file for complete search history.

(56) References Cited

U.S. PATENT DOCUMENTS

| | | | |
|---|---|---|---|
| 5,624,188 | A | 4/1997 | West |
| 6,386,755 | B1 | 5/2002 | Draxton |
| 6,564,164 | B1 | 5/2003 | Ih |
| 6,726,358 | B2 | 4/2004 | Draxton |
| 6,834,992 | B2 | 12/2004 | Draxton |
| 7,434,988 | B1 | 10/2008 | Kychakoff |
| 2004/0052295 | A1 | 3/2004 | Droppo, III |
| 2012/0150413 | A1* | 6/2012 | Bunce ............... F02C 9/28 701/100 |

OTHER PUBLICATIONS

J. Chen, et. al., Time Delay Estimation in Room Acoustic Environments: An Overview, Hindawi Pub. Corp., EURASIP Journal on Applied Signal Processing, V. 2006, 1-19, Sep. 2005.
I. Jovanovic, et. al., Acoustic Tomography Method for Measuring Temp. and Wind . . . , IEEE Int. Conf. Acoustics, Speech and Signal Proc., ICASSP Proc., V. 4, 1141-4, May 2006.
H. Sielschott, et al., Waveform Inversion in Acoustic Pyrometry, 1st World Congress on Industrial Process Tomography, Buxton, Greater Manchester, 528-541, Apr. 14-17, 1999.
Dr. Peter Ariessohn, Development of an Acoustic Sensor for On-Line Gas Temperature Measurement in Gasifiers, Technical Progress Report, Jan. 15, 2006.
Mauro Bramanti, et al., An Acoustic Pyrometer System for Tomographic Thermal Imaging in Power . . . , IEEE Transactions on Instrumentation and Measurement, V. 45, N.1, Feb. 1996.
Brian Moss, et al., Temperature Measurement of Gases Using Acoustic Meanings, 6th Int. Multi-Conference on Systems, Signals, and Devices, Mar. 2009.
G. Q. Shen, L. S. AN, G. S. Jiang, Real-Time Monitoring on Boiler Combustion Based on Acoustic Measurement, Power India Conference, 2006 IEEE, May 2006.
G. Kychakoff, et al., Use of the Coustic Temperature Measurements in the Cement Manufacturing Pyroprocess, Cement Ind. Tech. Conf., Conf. Record, 23-33, May 2005.
B. Ewan, et al., Error Reduction Study Employing a Pseudo-Random Biary Sequence for use in Acoustic Pyometry of Gases, Rev. Scientific Instr., V. 71, N. 12, 4658-64, Dec. 2000.
R. B. Stones, P. J. Webb, The Application of Acoustic Pyrometry to Gas Temperature Measurement and Mapping, IEE Colloquium on Ultrasound in the Process Industry, Sep. 23, 1993.
C. Baharis, R. Cornish, Ultrasonic Detection of Heat Fronts in Continuously Cast Steel Product, IEEE Ultrasonics Symposium, 1991, Proceedings, V. 2, 957-960, Dec. 1991.
Y. J. Lee, et. al., Non-Invasive Process Temperature Monitoring Using Laser-Acoustic Techniques, Symposium on VLSI Technology, 1990. Digest of Tech. Papers, 105-6, Jun. 1990.
PCT International Search Report mailed Dec. 10, 2014 corresponding to PCT International Application No. PCT/US2013/056587 filed Aug. 26, 2013 (13 pages).
Upul Desilva et al.; Novel Gas Turbine Exhaust Temperature Measurement System; Proceedings of the ASME Turbo Expo 2013; GT2013-95153; Jun. 3-7, 2013; 8 pages.
Knapp H. C.; Carter G. C.: "The generalized correlation method for estimation of time delay" IEEE Transactions on Acoustics, Speech, and Signal Processing, vol. ASP-24, No. 4, 1976, pp. 320-327, XP002281206; 1976.
Chen J.: Benesty J.; Huang Y.: "Time delay estimation in room acoustic environments: an overview", EURASIP Journal of Applied Signal Processing, vol. 2006, pp. 1-19, XP055114845; 2006.

* cited by examiner

NOISE ROBUST TIME OF FLIGHT ESTIMATION FOR ACOUSTIC PYROMETRY

STATEMENT OF RELATED CASES

The present application claims priority to and the benefit of U.S. Provisional Patent Application Ser. No. 61/696,852 filed on Sep. 5, 2012, which is incorporated herein by reference in its entirety.

GOVERNMENT RIGHTS

This invention was made with government support under Contract No DE-FC26-05NT42644. The government may have certain rights in his invention.

TECHNICAL FIELD

The present invention relates to temperature measurement of a gas. More in particular it relates to acoustic pyrometry to measure a temperature of the gas.

BACKGROUND

Time of flight estimation for acoustic pyrometry evaluates the propagation time of an acoustic signal in a hot gas. This is further used, across multiple paths, to estimate the temperature distribution in this environment. State-of-the-art applications of this technology focus on relatively static environments with low airflow, low turbulence and low noise distortions, such as boilers or furnaces. However, current approaches fail in complex environments such as a gas turbine exhaust. Complex environments introduce variability between the sent and received signal and make it difficult to distinguish the received signal from noise.

Accordingly, novel and improved methods and systems to apply acoustic pyrometry for a gas in a complex flow environment are required.

SUMMARY

In accordance with an aspect of the present invention methods and systems are provided to measure a temperature of a medium by applying acoustic pyrometry.

In accordance with a further aspect of the present invention a method is provided for acoustic pyrometry by measuring a time of flight of an acoustic signal between a source and a receiver through a medium with a temperature, comprising: a processor processing a plurality of samples representing the acoustic signal at the source and the receiver to generate data that represent the plurality of samples in a frequency domain; arranging the data that represent the samples in the frequency domain in a plurality of frequency ranges and selecting one or more frequency ranges with a minimal influence of noise; correlating the data in each selected frequency range of the source with corresponding data of the receiver to determine a weighted cross-spectral power estimate value for each selected frequency range related to the source corresponding to a delay time; determining a summation of the maximum weighted cross-spectral power estimate value of each of the selected frequency ranges by using a range of delays wherein the summation has a maximum, such that a sparseness of a mean weighted cross-spectral power estimate of the selected frequency ranges is maximized; and applying the determined signal delay between the source and the receiver to calculate a temperature of the medium.

In accordance with yet a further aspect of the present invention a method is provided, further comprising, the processor arranging the plurality of samples representing the acoustic signal at the source and the receivers into a plurality of windows.

In accordance with yet a further aspect of the present invention a method is provided, further comprising, the processor arranging the data that represent the plurality of samples in the frequency domain in a plurality of bins and selecting one or more bins with a minimal influence of noise.

In accordance with yet a further aspect of the present invention a method is provided, wherein the plurality of weighted cross-spectral power estimates apply a smoothed coherence transform (SCOT) cross-correlation.

In accordance with yet a further aspect of the present invention a method is provided, wherein a function that maximizes the sparseness is expressed as:

$$\arg\max_{t} \left\| \frac{1}{N} \sum_{n=1}^{N} R_{n,k,m}(\tau + t_n) \right\|_1 \text{ with } -d \leq t_n \leq d,$$

wherein $t_n$ is a time variation within a range $[-d, d]$; N is a number of windows; $\tau$ is a delay time of a signal; n is an index indicating a window; k is an index indicating a source; m is an index indicating a receiver; and $R_{n,k,m}(\tau+t_n)$ represents a smoothed coherence transform cross-correlation for a signal represented in window n, from source k and received at receiver m at a time difference $(\tau+t_n)$.

In accordance with yet a further aspect of the present invention a method is provided, wherein a window is based on a physically minimum possible propagation delay from the source to the receiver given a temperature range of interest.

In accordance with yet a further aspect of the present invention a method is provided, further comprising: determining a plurality of signal delays for a plurality of signals generated by a plurality of sources and received by a plurality of receivers.

In accordance with yet a further aspect of the present invention a method is provided, wherein a preferred signal delay is determined from the plurality of signal delays by applying a physical model based on a distance traversed by the acoustical signal.

In accordance with yet a further aspect of the present invention a method is provided, wherein the method is applied to determine a temperature in a gas turbine.

In accordance with yet a further aspect of the present invention a method is provided, wherein the method is applied to determine a temperature in a nuclear power plant.

In accordance with another aspect of the present invention a system is provided to measure a time of flight of an acoustic signal between a source and a receiver through a medium with a temperature, comprising: a memory enabled to store data and instructions; a processor enabled to execute instructions retrieved from the memory to perform the steps: processing a plurality of samples representing the acoustic signal at the source and the receiver to generate data that represent the plurality of samples in a frequency domain; arranging the data that represent the samples in the frequency domain in a plurality of frequency ranges and selecting one or more frequency ranges with a minimal influence of noise; correlating the data in each selected frequency range of the source with corresponding data of the receiver to determine a weighted cross-spectral power estimate value for each selected frequency range related to the source corresponding to a delay time; determining a summation of the maximum weighted cross-spectral power estimate value of each of the selected frequency ranges by using a range of delays wherein the summation has a maximum, such that a sparseness of a mean weighted cross-spectral power estimate of the selected frequency ranges is maximized; and applying the determined signal delay between the source and the receiver to calculate a temperature of the medium.

In accordance with yet another aspect of the present invention a system is provided, further comprising, the processor arranging the plurality of samples representing the acoustic signal at the source and the receivers into a plurality of windows.

In accordance with yet another aspect of the present invention a system is provided, further comprising, the processor arranging the data that represent the plurality of samples in the frequency domain in a plurality of bins and selecting one or more bins with a minimal influence of noise.

In accordance with yet another aspect of the present invention a system is provided, wherein the plurality of weighted cross-spectral power estimates apply a smoothed coherence transform (SCOT) cross-correlation.

In accordance with yet another aspect of the present invention a system is provided, wherein a function that maximizes the sparseness is expressed as:

$$\arg\max_{t} \left\| \frac{1}{N} \sum_{n=1}^{N} R_{n,k,m}(\tau + t_n) \right\|_{1}$$

with $-d \le t_n \le d$, wherein $t_n$ is a time variation within a range $[-d, d]$; N is a number of windows; $\tau$ is a delay time of a signal; n is an index indicating a window; k is an index indicating a source; m is an index indicating a receiver; and $R_{n,k,m}(\tau+t_n)$ represents a smoothed coherence transform cross-correlation for a signal represented in window n, from source k and received at receiver m at a time difference $(\tau+t_n)$.

In accordance with yet another aspect of the present invention a system is provided, wherein a window is based on a physically minimum possible propagation delay from the source to the receiver given a temperature range of interest.

In accordance with yet another aspect of the present invention a system is provided, further comprising: the processor determining a plurality of signal delays for a plurality of signals generated by a plurality of sources and received by a plurality of receivers.

In accordance with yet another aspect of the present invention a system is provided, wherein a preferred signal delay is determined from the plurality of signal delays by applying a physical model based on a distance traversed by the acoustical signal.

In accordance with yet another aspect of the present invention a system is provided, wherein the method is applied to determine a temperature in a gas turbine.

In accordance with yet another aspect of the present invention a system is provided, wherein the method is applied to determine a temperature in a nuclear power plant.

DRAWINGS

DESCRIPTION

Current acoustic pyrometry approaches fail in complex flow environments such as in gas turbines. In accordance with one or more aspects of the present invention methods are provided in acoustic pyrometry to compensate for short time fluctuations in the received signal as well as to reduce noise in the time of flight estimation and to find and exclude estimation errors.

Figure 1:
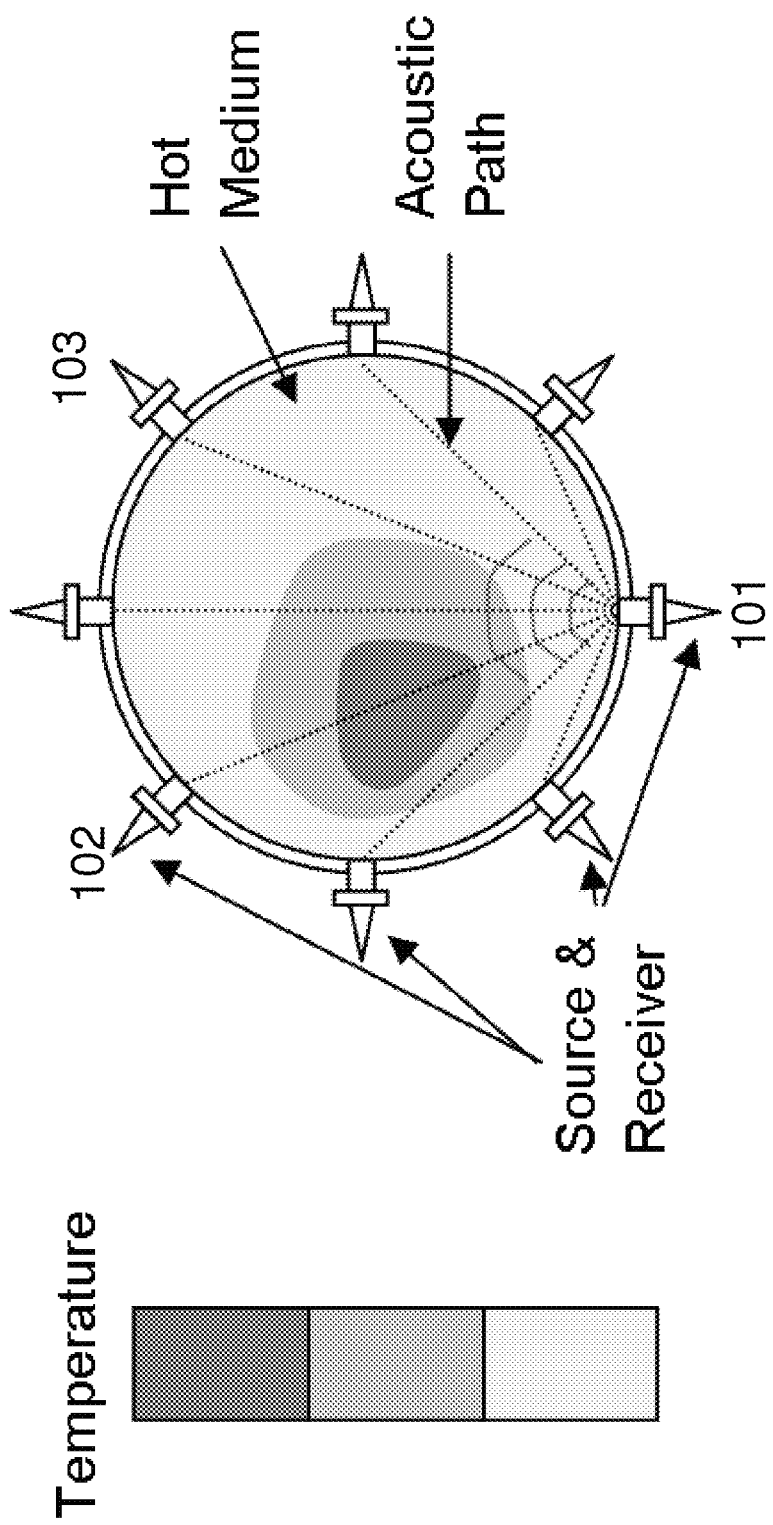
FIG. 1 illustrates an acoustic pyrometry configuration in accordance with at least one aspect of the present invention.

The general setup of an acoustic pyrometer system is illustrated in FIG. 1 which shows a recording setup of time of flight based acoustic pyrometry. An acoustic wave is generated by a source (101) and recorded by receivers (101 and 102) after propagation through the hot gas medium. The wave propagation speed is affected by the temperature of the medium. The distribution of the temperature is estimated based on the measured time of flights across multiple acoustic paths. As illustrated in FIG. 1, the path from 101 to 102 includes gas that has a significantly higher temperature than the path from 101 to 103.

One goal is to estimate the temperature distribution in a gas medium. For this, the travel time of a sound wave from the source to each of the receivers is estimated. In the following this travel time is referred to as time of flight. Aspects of the present invention are focused on the estimation of this time of flight in harsh environments.

The time of flight t is linked to the mean temperature of the medium T (in Kelvin) along a path as well as the distance d between the source and receiver, the gas constant R, the specific heat capacity ratio of the gas γ and the mean molecular weight M of the gas as follows:

$$T = \left( \frac{d}{\sqrt{\frac{\gamma \cdot R}{M}} \cdot t} \right)^2 .$$

Thus, it is possible to determine the gas temperature based on the time of flight if the gas composition and the acoustic distance between the source and receiver are known.

One advantage of measuring the temperature by acoustic means is that the sensors do not have to be inside the medium. In this way it is possible to measure high temperatures or radiation in very harsh conditions such as corrosive environments. This would otherwise not be possible or require expensive sensors.

Another advantage of acoustic based temperature estimation is its high speed and accuracy. The speed of the measurement is given by the travel time of the sound and is not limited by e.g., the heat-up time (thermal capacity) of the sensor.

Acoustic pyrometry has been successfully applied in many fields and there exist multiple related patents including U.S. Pat. No. 7,434,988 B2 issued on Oct. 14, 2008 to Kychakoff et al., U.S. Pat. No. 6,834,992 B2 issued on Dec. 28, 2004 to Draxton et al., U.S. Pat. No. 6,726,358 B2 issued on Apr. 27, 2004 to Draxton et al., U.S. Pat. No. 6,564,164 B1 issued on May 13, 2003 to Ih, et al., U.S. Pat. No. 6,386,755 B1, U.S. Pat. No. 5,624,188 issued on Apr. 29, 1997 to West, U.S. Pat. No. 5,349,859 A1 issued on Sep. 27, 1994 to Kleppe, and U.S. Pat. No. 4,848,924 A1 issued on Jul. 18, 1989 to Nuspl, et al. and which are all incorporated herein by reference in their entirety.

However, it is believed that none of these patents addresses the signal processing challenges of robustly finding the time of flight of the emitted signal in environments that have high airflow, turbulences, and noise distortions.

Commonly, time of flight is estimated using the envelopes of the transmitted and delayed received signal or simple correlation methods. However, these methods only work in low noise environments, for a limited range of delays, with uncorrelated spectral content of the emitted signal from noise or single path problems. Multiple improvements have been proposed in the literature to make these methods more robust to real world environments. For example, spectral weighting and normalization is used in the Roth processor, the smoothed coherence transform (SCOT), the phase transform (PATH), the Eckart filter or maximum likelihood approaches have been described in "[1] Knapp H. C., Carter G. C., 'The generalized correlation method for estimation of time delay'. IEEE transactions on acoustics, speech, and signal processing, vol. asp-24, no 4, pp. 320-327, 1976." This weighting reduces the impact of noise and the sensitivity to the spectral content of the emitted signal.

Chen et al. in "[2] Chen J., Benesty J., Huang Y., 'Delay estimation in room acoustic environments: an overview'. EURASIP journal of applied signal processing, vol. 2006, pp. 1-19. 2006" present methods that account for multipath and are thus more robust in echoic environments. While these methods are important extensions to the basic correlation approach they are not sufficient in the high noise environments that is aimed for in accordance with at least one aspect of the present invention.

Also, the above referenced methods do not take into account turbulences, which result in scattering of the observed time of flight. The energy of the peak that indicates the time of flight is diluted when summing over longer periods of time without correcting for this scattering effect. Thus, finding the correct time of flight in noise is more difficult when turbulences are present. The effect of wind on acoustic tomography is discussed in for instance "[3] Jovanovic I., Sbaiz L., Vetterli M., 'Acoustic tomography method for measuring temperature and wind velocity'. IEEE international conference on acoustics, speech, and signal processing, pp. 1141-1144, 2006."

Additional robustness of acoustic pyrometry approaches is achieved using physical modeling. That is, prior knowledge about the physical environment such as minimum and maximum temperatures, layout of the room, position of the source and receiver etc., is used to limit the search range and disregard improbable results. An implementation of such a model based acoustic pyrometer solution using waveform inversion is given by "[4] Sielschott H., Wubbeling F., 'Waveform inversion in acoustic pyrometry'. World congress on industrial process tomography, pp. 538-541, 1999."

A method provided herein in accordance with an aspect of the present invention for noise robust time of flight estimation combines state-of-the-art with novel extensions to achieve optimal results. An overview of the processing flow for this novel approach can be found in FIG. 2.

In a first step 201 the recording is triggered through the activation of one of the sources and is detected in a step 203. The acoustic data is recorded at a step 205 with a high sampling frequency of e.g., 100 kHz to achieve high time accuracy in the later time of flight estimation stage. If necessary, the start and stop of the acoustic source can easily be detected in high noise due to the proximity of the source with one of the receivers. The data from the beginning of the source activation until shortly after the end of the source activation, when all receivers finished receiving the signal, is then passed to the next processing block.

In the windowing block 207, the data is cut into shorter, partially overlapping segments. In this way the processing trades off the temporal and spectral resolution of the analyzed data. For example, if the source was recorded for 1 s, the window length is selected to 100 ms and the windows are overlapping by 90 ms, then the whole data is represented in 91 windows. The maximum resolution of such a window is 10 Hz in the frequency domain and 10 ms in the temporal domain. However, note that only 10% of the window content is changing between consecutive windows when analyzing the energy in the window.

It is noted that one may change the amount of overlap and even have no overlap.

Figure 3:
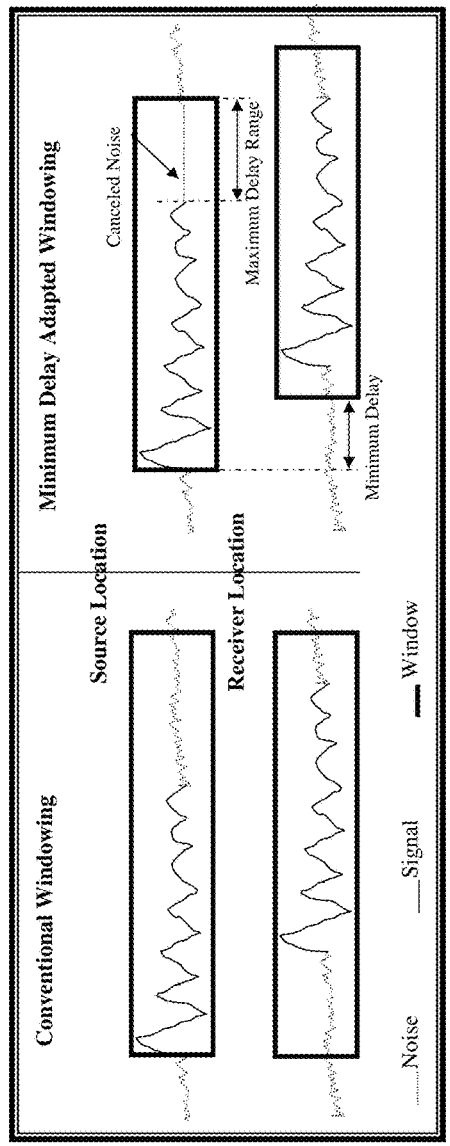
FIG. 3 illustrates data windows provided in accordance with an aspect of the present invention.

Additionally, the windowing block accounts for the physically minimum possible delay between the signal at the source location and the receiver locations given a temperature range of interest. The approach is illustrated in FIG. 3. The goal of this procedure is to maximize the correlated signal content between the window that contains the signal at the source and the one at the receiver. Additional, the window length is selected to the signal length plus the maximum possible delay range. Also, the noise content in the window of the signal at the source location is zeroed out to minimize noise contributions in further processing steps. Thus, the method that is subsequently used to find the delay between the signals in the windows, which represent the source and receiver locations, can utilize a larger signal length and is less influenced by noise or other irrelevant signal content.

Thus FIG. 3 illustrates a minimum delay adapted windowing. The procedure maximizes the correlated signal content in the windows by accounting for the physically minimum possible propagation delay from the source to the receiver given a temperature range of interest.

The physically minimum possible delay or time of flight $t_{min}$ is computed given the maximum possible temperature $T_{max}$ as:

$$t_{min} = \frac{d}{\sqrt{\frac{\gamma.R.T_{max}}{M}}}.$$

Figure 2:
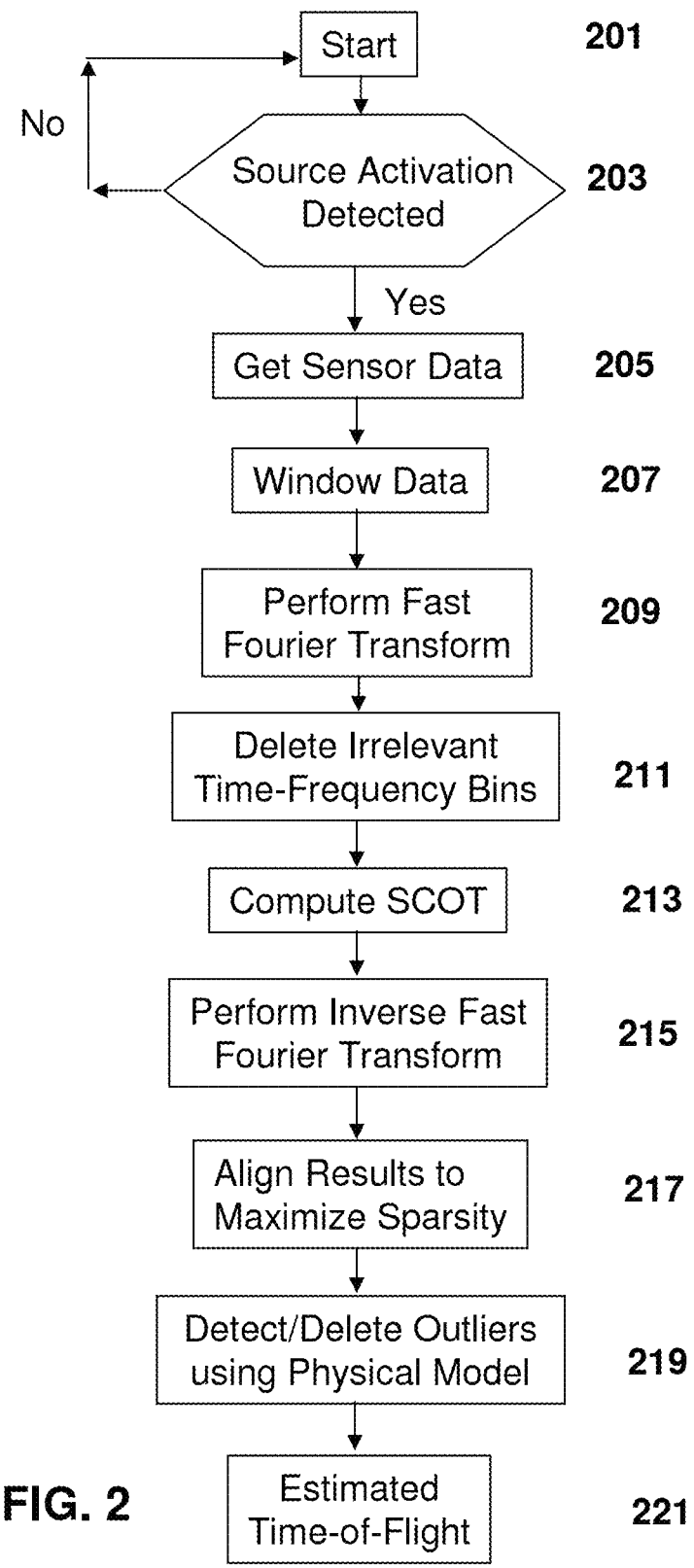
FIG. 2 illustrates steps of a method for acoustic pyrometry provided in accordance with an aspect of the present invention.

In the following, discontinuities in the beginning and end of the windows are prevented by using Hann-like window weighting. The goal of this is to minimize artifacts when the data is transferred to the spectral domain. However, to prevent a bias of the time of flight estimation towards the envelope of the weighting function a rectangular window is used with smoothened ends following a Hann function. Thereafter, the data is transferred into the spectral domain using a fast Fourier transform as illustrated in FIG. 2 step 209.

In the next processing step 211, a number of frequency bins is selected to represent the signal at a maximum signal to noise ratio. In step 211 one or more irrelevant bins are deleted or removed from consideration. The goal of this step is to increase the noise robustness of the algorithm and improve the time of flight estimation accuracy of the following steps. The frequency bins are selected based on the observed signal and noise energies. For example, if the signal is broad-band but its propagation attenuates the signal above 8000 Hz and most of the noise energy is concentrated below 500 Hz then frequency bins between 500 Hz and 8000 Hz are selected to best represent the signal. In another instance where the signal content is controlled to be sparse in the time frequency space that is minimally covered by noise, these sparse time frequency bins would be selected to best represent the signal.

There are several ways to distinguish spectral content of which creating bins is just one illustrative example. One may for instance use a moving window or any other method that allows for selectively determining spectral content in a limited bandwidth. In accordance with an aspect of the present invention one determines with a processor a spectral content of the samples in at least one, or at least two or three or more frequency ranges. In one embodiment of the present invention one applies frequency bins.

In the next steps the time of flights are estimated using the remaining preprocessed signal content at the source and the receivers. This is implemented on a window by window basis using the smoothed coherence transform (SCOT).

The weighting of the cross spectral density function in determining a cross-spectral power estimate can be performed in different ways. One is the smoothed coherence transform (SCOT), which is applied herein as an illustrative example. Other weighting methods are possible and are fully contemplated and may include the Roth processor, the Phase Transform (PHAT), the Eckart Filter, the HT Processor and others as known to one of ordinary skill. A selection of a weighting function may depend on operational conditions of the measurements such as turbulence or environmental noise. The term used herein for the processing step will be called weighted cross-spectral power estimation.

In particular, step 213 performs the weighting of the cross spectral density function in the manner of the smoothed coherence transform (SCOT). Thereafter, step 215 performs an inverse FFT thus allowing estimation of the delays in the time domain. In step 217 the results are aligned to address variations for instance based on turbulence and noise like effects. In step 219 model is applied to remove outliers. In step 221 the time-of-flight is determined and from that a temperature is calculated. In the following, the process is discussed in more detail.

Denote $X_{n,m}$ being a member of the set of real numbers with dimension F as the window n=1 ... N of data in the spectral domain with F spectral bins at the sensor location m=1 ... M. Furthermore, assume that the sensor location m=k is representing the source location while m≠k represents the receiver locations. Note that k=1 ... M can change between experiments. The cross spectral power between the source and receiver location is defined as $G_{n,k,m}=X_{n,k}X_{n,m}^*$.

A simple way to estimate the delay between the signal at the source location and the receiver location is by cross correlation:

$$R_{n,k,m}(\tau) = \sum_{f=1}^{F} G_{n,k,m}(f) e^{-i2\pi f \tau}$$

The delay τ that represents the highest amplitude in $R_{n,k,m}$ equals the estimated time of flight between receiver m and source k in window n. The drawback of this approach is that it does not take the effect of transfer functions of the channels between the source and the sensors into account. For example, if the channels from the source to the sensors reduce the signal energy above 4 kHz and there exists high noise energy in frequencies below 4 kHz then the cross correlation would focus on the high energy noise signal, deemphasize the information content of the higher frequencies and possibly return a wrong time of flight estimate.

In contrast, SCOT aims to utilize all spectral content for time of flight estimation by pre-whitening based on the spectral content of the signals at the source and receiver locations:

$$R_{n,k,m}(\tau) = \sum_{f=1}^{D} \frac{G_{n,k,m}(f)}{G_{n,k,k}(f)G_{n,m,m}(f)} e^{-i2\pi f \tau}.$$

In the next stage, the method addresses scattering of the time of flight results e.g., due to turbulences. A simple approach of time of flight estimation from multiple windows takes the sum of the SCOT results $R_{k,m}(\tau)=\Sigma_{n=1}^{N}R_{n,k,m}(\tau)$ and finds τ that represents the highest amplitude in $R_{k,m}$. The goal of this summation is the reduction of the amplitude of noise peaks in the SCOT result. This τ is thereafter used as the estimate for the time of flight between the signals at location k and m. However, in turbulent environments τ is not equal over n. Even small variations of τ lead to significantly decreased amplitudes in the result because of the spiky characteristic of the SCOT output. This can lead to misdetection of the time of flight in noisy environments. The approach provided herein in accordance with an aspect of the present invention addresses this problem by allowing for small variations in between different windows n that maximize the sparseness of the mean SCOT result.

Figure 4:
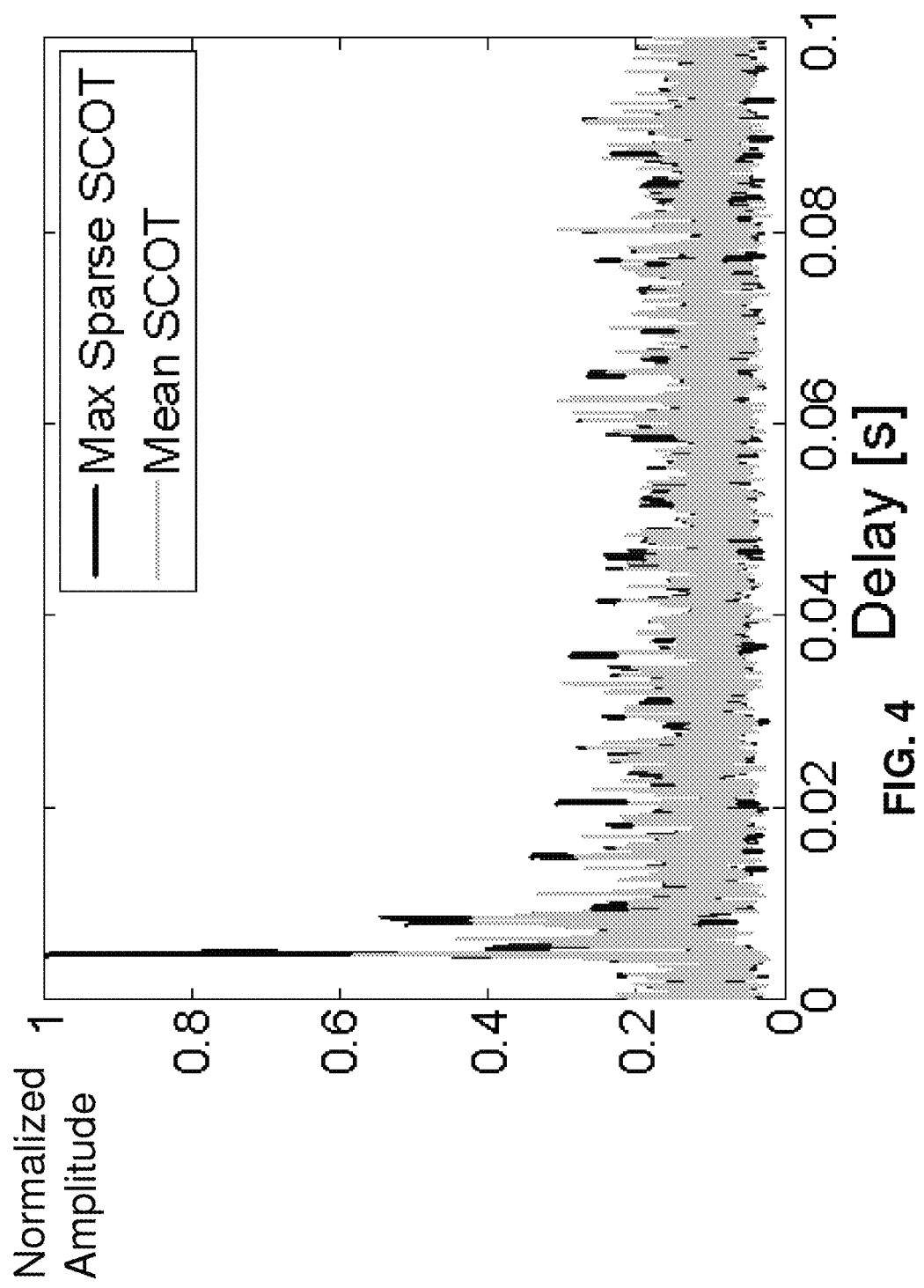
FIG. 4 illustrates an effect of sparsifying data in accordance with one or more aspects of the present invention.

A comparison of the maximally sparse SCOT approach with the simple mean of SCOT results is illustrated in FIG. 4 with a comparison of the maximum sparse combination of SCOT results from different windows with the mean result. The highest peak from the signal delay of the mean SCOT result is 59% of the maximum sparse combination of SCOT windows. The noise related peaks are comparable for both approaches.

The function that describes the maximally sparse SCOT approach is given by:

$$\arg\max_{t} \left\| \frac{1}{N}\sum_{n=1}^{N} r_{n,k,m}(\tau, t_n) \right\|_1 \text{ with } -d \leq t_n \leq d$$

The maximally sparse SCOT result is computed to $$S_{k,m}(\tau) = \frac{1}{N}\sum_{n=1}^{N} R_{n,k,m}(\tau + t_n)$$

after finding the random delays $t_n$ in the maximal allowed time scattering range $-d \leq t_n \leq d$, with d representing a boundary of this range. The estimated time of flight between k and m is given by the delay r that represents the highest amplitude in $S_{k,m}(\tau)$.

One motivation for allowing variability between the delays from different windows is given above: random delays from turbulences. The signal may be too noisy to estimate the time of flight from a single window. However, when taking the mean without considering the random delays from the turbulences then the time of flight peak may be canceled. The above function, which may be called a cost function, models the time of flight plus a random delay between −d and d samples. That is, for every possible time of flight the different windows are aligned such that they result in the highest peak. The result is the delay/time of flight with the highest peak when using this method. This is then considered the time of flight between k and m. In case there exist multiple solutions with similar amplitude of the highest peak the solution is preferred that requires minimum modification of the data and thus has a minimum $\|t_n\|_2$.

In one stage of the method provided herein in accordance with an aspect of the present invention, the noise robustness is further improved using a physical model that allows selection of time of flight peaks based on all M−1 time of flight estimation results. In extremely noisy environments it is possible that peaks in the maximally sparse SCOT that are resulting from noise or reflections are higher than the one of the signal of interest. This is even the case if one limits the results to the physically meaningful range based on the source-receiver distance and the temperature range of interest.

The method accounts for this problem by allowing the selection of multiple peaks for each set of locations k and m in case of unclear results. In a further step, the peak of each set of possible time of flights is selected that best fits the expected result based on the sets from all source receiver pairs. In the following an example of such a physical model is given and described in more detail.

First, the decision is made if there exists a clear time of flight result or if multiple peaks have to be considered. This is done by comparing the maximal height of the SCOT peaks at delays that are physically impossible, and thus have to be result from noise, to the maximal height at the range of interest. The peaks are selected that clearly stand out from the noise floor e.g., that exceed it by 10% of the difference between noise floor and maximum signal response.

In the following it is assumed that the acoustic pyrometer is measuring temperature of hot gas flowing through a circular pipe. In this case, the temperature distribution in this pipe is approximated to be Gaussian. That is, the temperature at a constant distance from the walls is equal. If the system heats up, the central part of the pipe has a higher temperature and if it cools down then the central part of the pipe has potentially a lower temperature then the areas close to the wall.

Furthermore, it is assumed that the highest peak in the maximally sparse SCOT result is likely to represent the correct time of flight. Thus, in a first step, the algorithm fits a parametric Gaussian temperature model to the time of flight data using these highest peaks from all source-receiver pairs. In a second step the peak is selected from each set of peaks and each source-receiver pair that best fits to this model. In this way the algorithm corrects for outliers using information from all source-receiver pairs.

Figure 5:
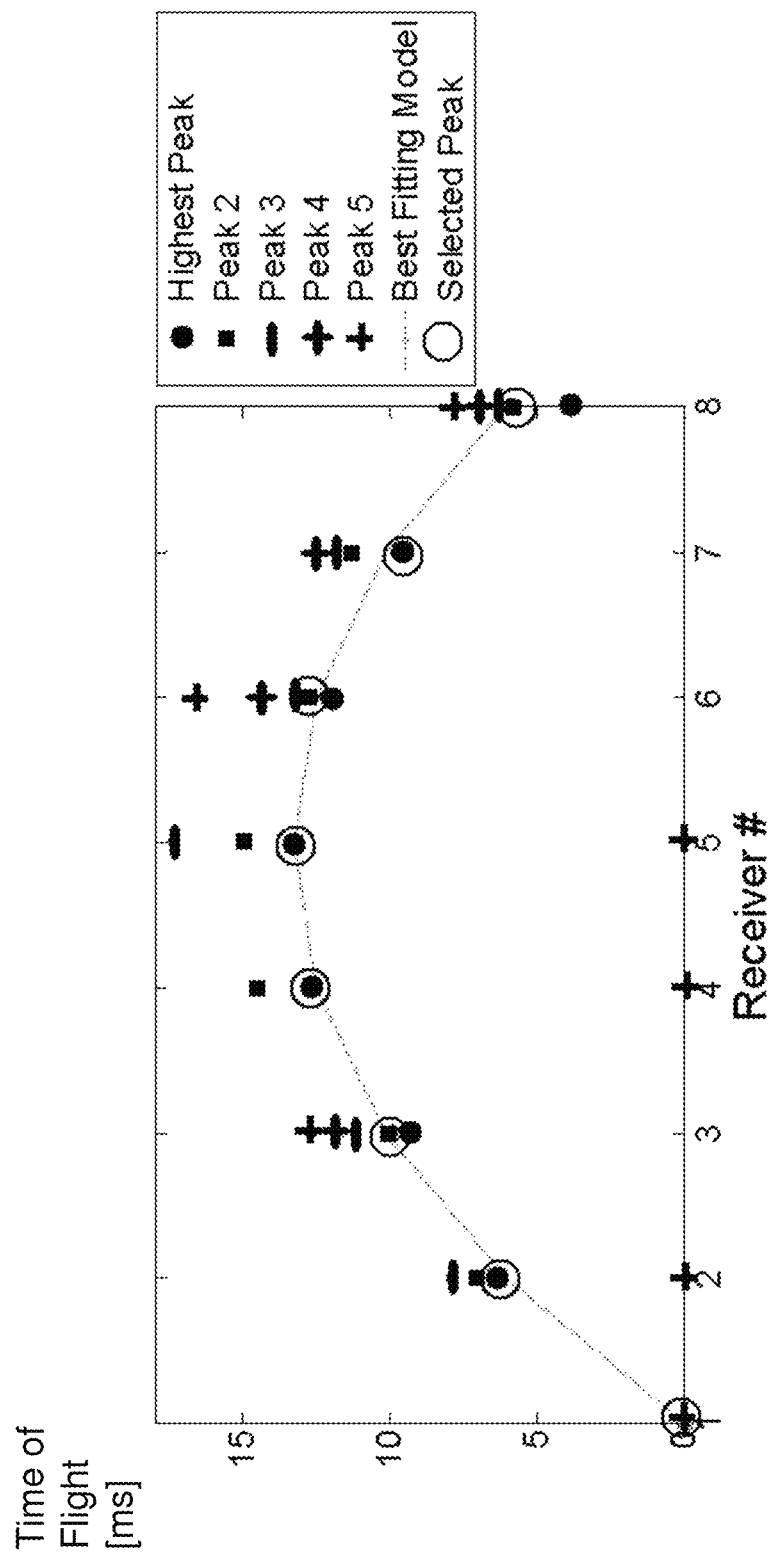
FIG. 5 illustrates application of a physical model to acoustic pyrometry results in accordance with one or more aspects of the present invention.

The approach is illustrated in FIG. 5 which shows a model based time of flight selection in high noise environments. A physically motivated model is fitted with the highest peak of each receiver from the maximum sparse SCOT result. A peak is selected for each receiver that fits the fitted physically motivated model best. Thus, single outliers are detected and canceled.

One possible implementation of this physical model based noise filtering is described as follows. Use the distance between the signals at k and m and the time of flight of the highest peak from the maximum sparse SCOT result. Furthermore, determine the relative amplitude of the highest peak of one set of k and m to all possible paths.

Finally, determine the mean temperatures on the paths between k and m when assuming a non scaled Gaussian temperature distribution. After defining a temperature offset and a scaling factor one can find the best fitting temperature by optimization.

After this outlier correction, the time of flight results are collected and passed on to further processing steps that e.g., compute a temperature map or track the temperature of the monitored system over time.

In one embodiment of the present invention the methods provided herein are applied to measure a temperature of a gas in a power generating turbine, a boiler, gasifier, compressor, exhaust or silo, boilers such as coal-fired electric utility boilers, kraft recovery boilers, cement kilns and petrochemical process heaters.

In one embodiment of the present invention, the methods provided herein are applied to measure a temperature in a radio-active environment, such as in a nuclear power plant or facility. The systems and methods provided herein are applied in one embodiment of the present invention to measure a temperature of a medium such as a gas with a preferred temperature of −40° C. or higher, a more preferred temperature of 700° C. or higher or 1000 K or higher and an even more preferred temperature of 1400° C. or higher.

Figure 6:
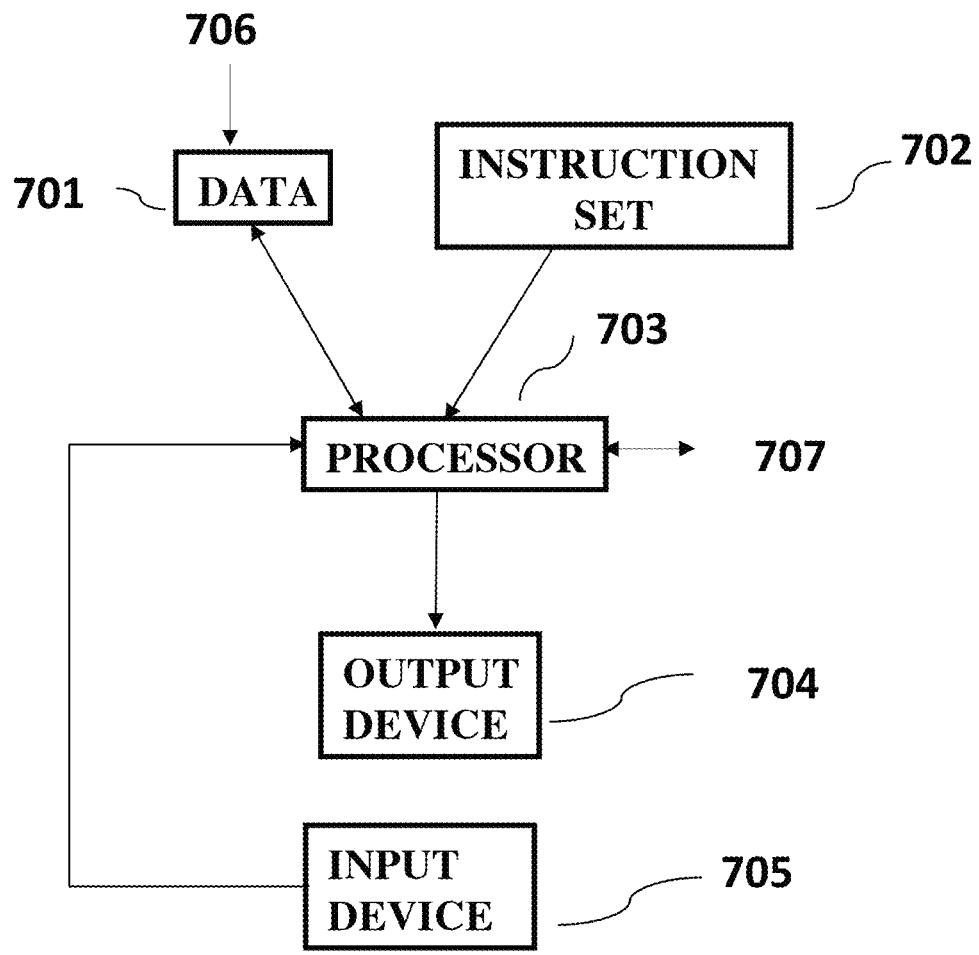
FIG. 6 illustrates a processor based system or computer enabled to execute instructions to perform the methods provided herein in accordance with various aspects of the present invention.

The methods as provided herein are, in one embodiment of the present invention, implemented on a system or a computer device. Thus, steps described herein are implemented on a processor in a system, as shown in FIG. 6. A system illustrated in FIG. 6 and as provided herein is enabled for receiving, processing and generating data. The system is provided with data that can be stored on a memory 701. Data may be obtained from a microphone for instance by applying an A/D converter. Data may be provided on an input 706. Such data may be acoustic data or any other data that is helpful in an acoustic system. The processor is also provided or programmed with an instruction set or program executing the methods of the present invention that is stored on a memory 702 and is provided to the processor 703, which executes the instructions of 702 to process the data from 701. Data, such as processed acoustic data or any other data provided by the processor can be outputted on an output device 704, which may be a display to display images or data or a data storage device. The processor also has a communication channel 707 to receive external data from a communication device and to transmit data to an external device. The system in one embodiment of the present invention has an input device 705, which may include a keyboard, a mouse, a pointing device, one or more microphones or any other device that can generate data to be provided to processor 703.

The processor can be dedicated or application specific hardware or circuitry. However, the processor can also be a general CPU or any other computing device that can execute the instructions of 702. Accordingly, the system as illustrated in FIG. 6 provides a system for processing data resulting from a sensor, a microphone or any other data source and is enabled to execute the steps of the methods as provided herein as one or more aspects of the present invention.

In accordance with one or more aspects of the present invention novel acoustic pyrometry processor based systems have been provided. Steps of various methods according to a novel acoustic pyrometry approach have been implemented on a processor based system.

Thus, novel systems and methods and steps implementing the methods have been described and provided herein for application of measuring temperatures by estimating time of flight of acoustic signals.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

The following references provide background information generally related to the present invention and are hereby incorporated by reference: [1] Knapp H. C., Carter G. C., "The generalized correlation method for estimation of time delay". IEEE transactions on acoustics, speech, and signal processing, vol. asp-24, no 4, pp. 320-327, 1976; [2] Chen J., Benesty J., Huang Y., "Delay estimation in room acoustic environments: an overview". EURASIP journal of applied signal processing, vol. 2006, pp. 1-19. 2006; [3] Jovanovic I., Sbaiz L., Vetterli M., "Acoustic tomography method for measuring temperature and wind velocity". IEEE international conference on acoustics, speech, and signal processing, pp. 1141-1144, 2006; and [4] Sielschott H., Wubbeling F., "Waveform inversion in acoustic pyrometry". World congress on industrial process tomography, pp. 538-541, 1999; and [5] Development of an Acoustic Sensor for On-Line Gas Temperature Measurement in Gasifiers, Technical Progress Report, Prepared for: US Department of Energy, National Energy Technology Laboratory, Pittsburgh, Pa., Prepared by: Dr. Peter Ariessohn, Enertechnix, Inc., Date Issued: Jan. 15, 2006.

While there have been shown, described and pointed out fundamental novel features of the invention as applied to preferred embodiments thereof, it will be understood that various omissions and substitutions and changes in the form and details of the methods and systems illustrated and in its operation may be made by those skilled in the art without departing from the spirit of the invention. It is the intention, therefore, to be limited only as indicated by the claims.

The invention claimed is:

1. A method for acoustic pyrometry comprising:
    recording, by a receiver of an acoustic pyrometer system, an acoustic signal generated by a source included in the acoustic pyrometer system and propagating through a gas medium traveling through a pipe or other channel;
    arranging a plurality of samples representing the acoustic signal at the source and the receiver into a plurality of windows based on a physically minimum possible propagation delay from the source to the receiver given a temperature range of interest;
    processing, by a processor within the acoustic pyrometer system, the plurality of samples representing the acoustic signal at the source and the receiver to generate data that represent the plurality of samples in a frequency domain;
    arranging, by the processor within the acoustic pyrometer system, the data that represent the samples in the frequency domain in a plurality of frequency ranges and selecting one or more frequency ranges with a minimal influence of noise;
    correlating, by the processor within the acoustic pyrometer system, the data in each selected frequency range of the source with corresponding data of the receiver to determine a weighted cross-spectral power estimate value for each selected frequency range related to the source corresponding to a delay time;
    determining, by the processor within the acoustic pyrometer system, a summation of the maximum weighted cross-spectral power estimate value of each of the selected frequency ranges by using a range of delays wherein the summation has a maximum, such that a sparseness of a mean weighted cross-spectral power estimate of the selected frequency ranges is maximized; and
    applying, by the processor within the acoustic pyrometer system, the determined signal delay between the source and the receiver to calculate a temperature of the gas medium.

2. The method of claim 1, further comprising, the processor arranging the data that represent the plurality of samples in the frequency domain in a plurality of bins and selecting one or more bins with a minimal influence of noise.

3. The method of claim 1, wherein the plurality of weighted cross-spectral power estimates apply a smoothed coherence transform (SCOT) cross-correlation.

4. The method of claim 1, wherein a function that maximizes the sparseness is expressed as:

$$\arg\max_t \left\| \frac{1}{N} \sum_{n=1}^{N} R_{n,k,m}(\tau + t_n) \right\|_1 \text{ with } -d \leq t_n \leq d,$$

wherein $t_n$ is a time variation within a range $[-d, d]$;
N is a number of windows;
$\tau$ is a delay time of a signal;
n is an index indicating a window;
k is an index indicating a source;
m is an index indicating a receiver; and
$R_{n,k,m}(\tau+t_n)$ represents a smoothed coherence transform cross-correlation for a signal represented in window n, from source k and received at receiver m at a time difference $(\tau+t_n)$.

5. The method of claim 1, wherein a window is based on a physically minimum possible propagation delay from the source to the receiver given a temperature range of interest.

6. The method of claim 1, further comprising:
    determining a plurality of signal delays for a plurality of signals generated by a plurality of sources and received by a plurality of receivers.

7. The method of claim 6, wherein a preferred signal delay is determined from the plurality of signal delays by applying a physical model based on a distance traversed by the acoustical signal.

8. The method of claim 1, wherein the method is applied to determine a temperature in a gas turbine.

9. The method of claim 1, wherein the method is applied to determine a temperature in a nuclear power plant.

10. An acoustic pyrometry system comprising:
an acoustic signal source enabled to generate an acoustic signal in a gas medium with a temperature;
a receiver enabled to record the acoustic signal traveling through the gas medium;
a memory enabled to store data and instructions;
a processor enabled to execute instructions retrieved from the memory to perform the steps:
arranging a plurality of samples representing the acoustic signal at the source and the receivers into a plurality of windows based on a physically minimum possible propagation delay from the source to the receiver given a temperature range of interest;
processing the plurality of samples representing the acoustic signal at the source and the receiver to generate data that represent the plurality of samples in a frequency domain;
arranging the data that represent the samples in the frequency domain in a plurality of frequency ranges and selecting one or more frequency ranges with a minimal influence of noise;
correlating the data in each selected frequency range of the source with corresponding data of the receiver to determine a weighted cross-spectral power estimate value for each selected frequency range related to the source corresponding to a delay time;
determining a summation of the maximum weighted cross-spectral power estimate value of each of the selected frequency ranges by using a range of delays wherein the summation has a maximum, such that a sparseness of a mean weighted cross-spectral power estimate of the selected frequency ranges is maximized; and
applying the determined signal delay between the source and the receiver to calculate a temperature of the gas medium.

11. The system of claim 10, further comprising, the processor arranging the data that represent the plurality of samples in the frequency domain in a plurality of bins and selecting one or more bins with a minimal influence of noise.

12. The system of claim 10, wherein the plurality of weighted cross-spectral power estimates apply a smoothed coherence transform (SCOT) cross-correlation.

13. The system of claim 10, wherein a function that maximizes the sparseness is expressed as:

$$\arg\max_t \left\| \frac{1}{N} \sum_{n=1}^{N} R_{n,k,m}(\tau + t_n) \right\|_1 \text{ with } -d \leq t_n \leq d,$$

wherein $t_n$ is a time variation within a range $[-d, d]$;
N is a number of windows;
$\tau$ is a delay time of a signal;
n is an index indicating a window;
k is an index indicating a source;
m is an index indicating a receiver; and
$R_{n,k,m}(\tau+t_n)$ represents a smoothed coherence transform cross-correlation for a signal represented in window n, from source k and received at receiver m at a time difference $(\tau+t_n)$.

14. The system of claim 10, further comprising:
the processor determining a plurality of signal delays for a plurality of signals generated by a plurality of sources and received by a plurality of receivers.

15. The system of claim 14, wherein a preferred signal delay is determined from the plurality of signal delays by applying a physical model based on a distance traversed by the acoustical signal.

16. The system of claim 10, wherein the instructions retrieved from the memory further cause the processor to determine a temperature in a gas turbine.

17. The system of claim 10, wherein the instructions retrieved from the memory further cause the processor to determine a temperature in a nuclear power plant.

18. A method for acoustic pyrometry comprising:
receiving, by a processor, a plurality of samples representing an acoustic signal generated by a source included in the acoustic pyrometer system and recorded by a recorder included in the acoustic pyrometer system, wherein the acoustic signal is recorded after propagating through a medium traveling through a pipe or other channel;
arranging, by the processor, the plurality of samples into a plurality of windows based on a physically minimum possible propagation delay from the source to the receiver given a temperature range of interest;
processing, by the processor, the plurality of samples representing the acoustic signal at the source and the receiver to generate data that represent the plurality of samples in a frequency domain;
arranging, by the processor, the data that represent the samples in the frequency domain in a plurality of frequency ranges and selecting one or more frequency ranges with a minimal influence of noise;
correlating, by the processor, the data in each selected frequency range of the source with corresponding data of the receiver to determine a weighted cross-spectral power estimate value for each selected frequency range related to the source corresponding to a delay time;
determining, by the processor, a summation of the maximum weighted cross-spectral power estimate value of each of the selected frequency ranges by using a range of delays wherein the summation has a maximum, such that a sparseness of a mean weighted cross-spectral power estimate of the selected frequency ranges is maximized; and
applying, by the processor, the determined signal delay between the source and the receiver to calculate a temperature of the medium.

* * * * *